Aug. 19, 1924.
W. M. SCOTT
1,505,107
SWITCHING APPARATUS
Filed Dec. 3, 1920        2 Sheets-Sheet 1
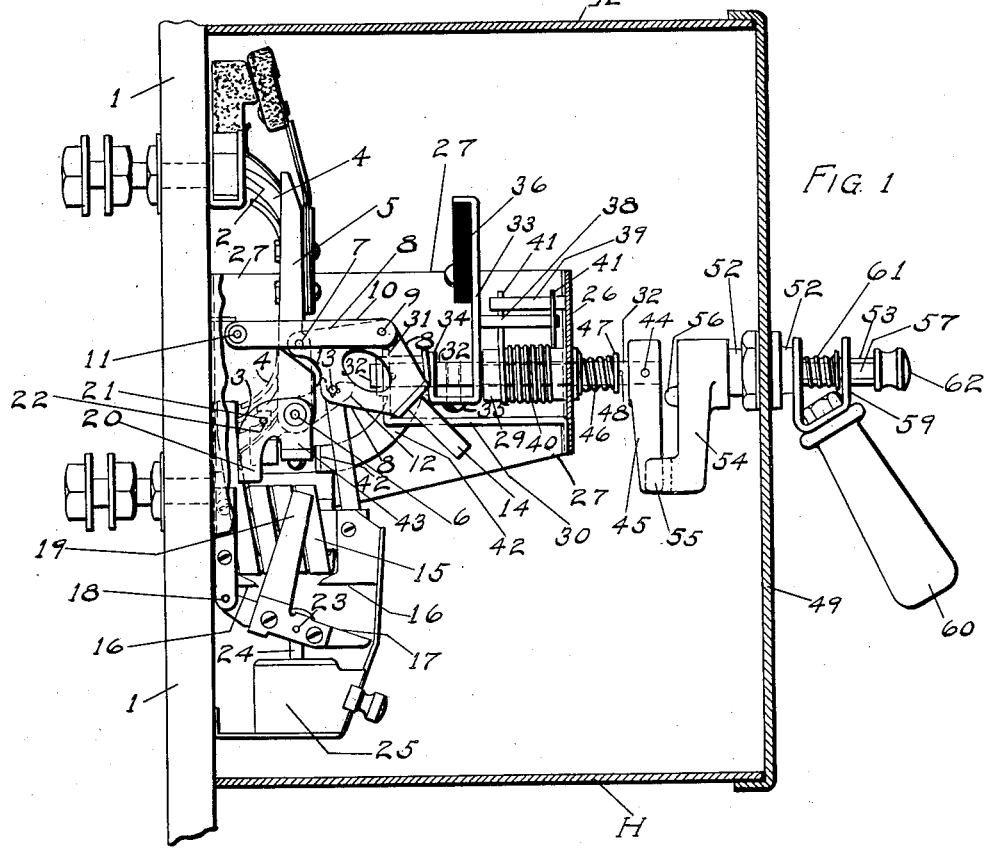
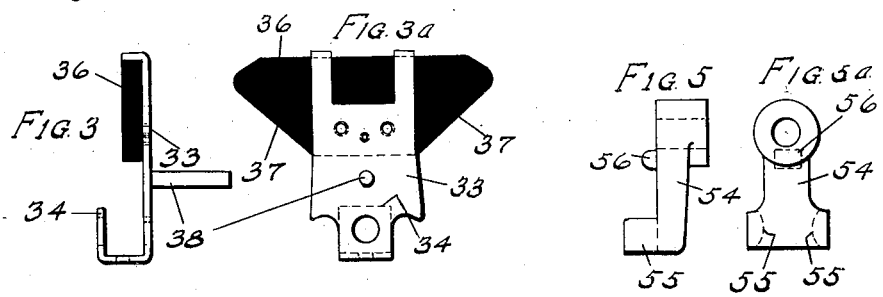
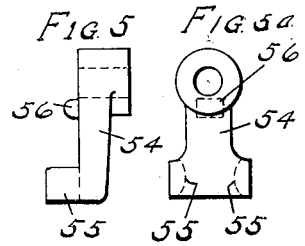
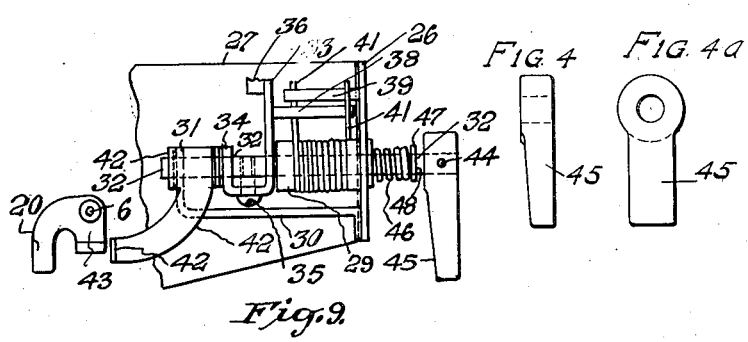
INVENTOR
William M. Scott
BY
Cornelius D. Ehret
his ATTORNEY Aug. 19, 1924.
W. M. SCOTT
SWITCHING APPARATUS
Filed Dec. 3, 1920    2 Sheets-Sheet 2
1,505,107
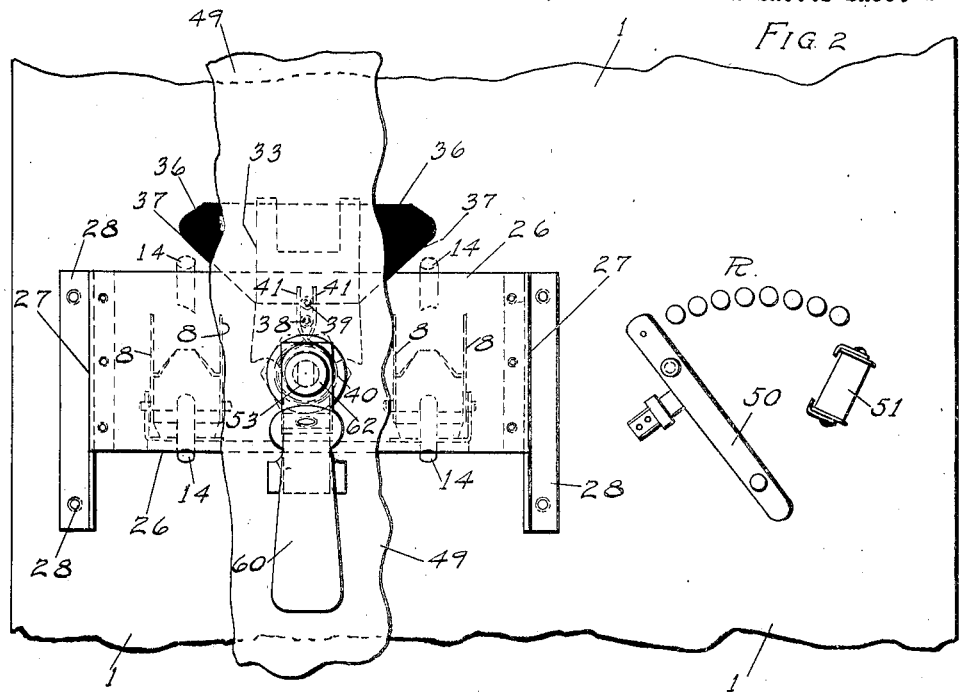
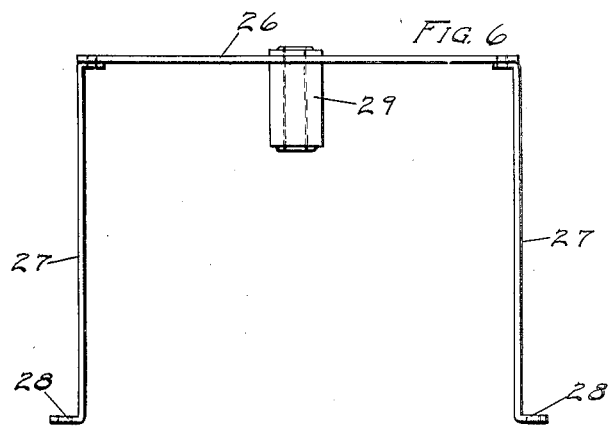
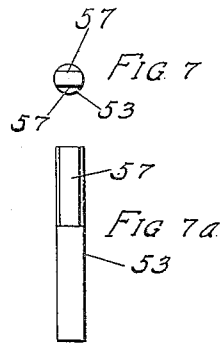
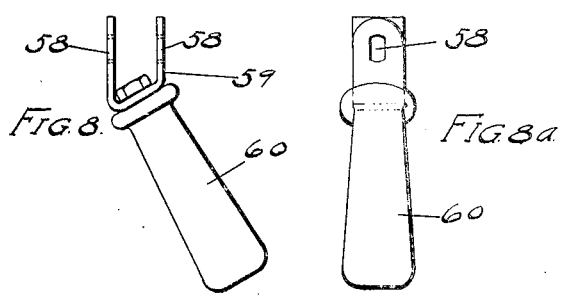
INVENTOR
William M. Scott
BY
Cornelius L. Ehret
his ATTORNEY Patented Aug. 19, 1924.

1,505,107

UNITED STATES PATENT OFFICE.

WILLIAM M. SCOTT, OF TREDYFFRIN TOWNSHIP, CHESTER COUNTY, PENNSYLVANIA.

SWITCHING APPARATUS.

Application filed December 3, 1920. Serial No. 427,979.

*To all whom it may concern:*

Be it known that I, WILLIAM M. SCOTT, a citizen of the United States, residing in Tredyffrin Township, in the county of Chester, State of Pennsylvania, have invented a new and useful Switching Apparatus, of which the following is a specification.

My invention relates to electrical switch or circuit breaker structure for controlling or protecting electric circuits carrying current for power lighting or other purposes.

My invention relates to electrical switches or circuit breakers which may have structural features disclosed in my prior application Serial No. 347,182, filed December 24, 1919, Patent No. 1,389,996, September 6, 1921.

My invention relates particularly to structure whereby switching or circuit breaker mechanism may be enclosed in a housing either by itself or in association with other switching or control mechanism, the actuating and controlling members for the switching or circuit breaker mechanism being carried by a wall of the housing, the housing wall being itself movable or detachable, or the entire housing being movable or detachable, the actuating and control members being detachably related with respect to corresponding actuating and control members within the housing.

My invention relates more particularly to structure of the character above referred to in which in the housing, or a compartment thereof, is located other switching or control apparatus actuated or controlled from the exterior of the housing, particularly by mechanism carried by the housing.

My invention resides in apparatus of the character hereinafter described and claimed.

For an illustration of one of the many forms my invention may take, reference is to be had to the accompanying drawings, in which:

Fig. 1 is a side elevational view, partly in vertical section, of apparatus embodying my invention.

Fig. 2 is a fragmentary front elevational view of the structure shown in Fig. 1.

Fig. 3 is a side view of a switch resetting or actuating member.

Fig. 3ª is a front elevational view of the same.

Figs. 4 and 4ª are, respectively, side and elevational views of elements shown in Fig. 1.

Figs. 5 and 5ª are side and elevational views, respectively, of further members shown in Fig. 1.

Fig. 6 is a plan view of a supporting member in Figs. 1 and 2.

Figs. 7 and 7ª are, respectively, end and side views of a control shaft.

Figs. 8 and 8ª are, respectively, side and front views of the operator's handle.

Fig. 9 is a fragmentary side elevational view of parts shown in Fig. 1.

Referring to the drawings, 1 is a base of slate or other suitable insulating material generally mounted in the vertical position indicated in Fig. 1. Upon the front of the base 1 are the stationary contact blocks or terminals 2 and 3 adapted to be bridged and connected by the movable laminated bridging member 4 carried by the arm 5 pivoted at 6 to a suitable support carried by the base 1. Pivoted to the arm 5 at 7 is the toggle member 8 pivoted at 9 to the toggle lever 10 which in turn is pivoted at 11 to a member carried by the base 1. Pivoted at 6 is the latch 12 adapted to engage the pin or roller 13 carried by the member 8, and thereby hold the bridging member 4 in circuit closing position indicated in Fig. 1, the center of the pivot 7 being, in circuit closing position, slightly below the line joining the centers of pivots 9 and 11, whereby there is formed an under set or under travelled toggle structure. Carried by the member 8 is the outwardly projecting pin or roller 14 by which the switch or circuit breaker structure may be reset in circuit closing position as hereinafter described.

In series with the switch or circuit breaker whose bridging member is 4 is the magnet coil or winding 15 having the holes 16, with which co-acts the armature 17, pivoted at 18 and having the upwardly extending member 19 adapted, when the armature 17 is attracted upon energization of the poles 16, 16 by current through the magnet winding 15, to engage and actuate the latch actuator 20 pivoted at 6 and carrying the pin 21 having slight lost motion in the slot 22 in the tail of latch member 12.

Pivoted to the armature 17 at 23 is a downwardly extending rod 24 carrying at its lower end within the pot 25 the movable element of a sucker start delay device, which may be employed or not, as found suitable or desirable.

As to one of the aspects of my invention it is preferable, as in my aforesaid prior patent, to employ side by side upon the base 1, as indicated in Fig. 2, two of the switch or circuit breaker mechanisms of the character described, each of the switches or circuit breakers being provided with its own tripping coil 15 and locking mechanism, or a single magnet being employed for actuating a tripping member which will actuate the latches or locking mechanisms of both switches, either of these arrangements being per se well known in the art. Furthermore, as well known in the art, these switches or circuit breakers may be and preferably are connected in series in the same circuit, preferably one in each of the opposite sides of a circuit. As in the case of so-called "non-closable" circuit breakers, so also in the case of "double arm" circuit breakers of the character herein disclosed, upon occurrence of an abnormal electrical condition the circuit cannot be permanently or effectively closed because upon attempted closure the automatic tripping mechanism operates in response to the abnormal electrical condition to trip that arm or pole which was first closed.

In Fig. 2 the position of the two switches or circuit breakers is indicated by their members 8 and 14.

Associated with the switches or breakers, and disposed within the housing hereinafter referred to, is any suitable support, standard or equipment for supporting in operative relation with both arms of the switch or circuit breaker mechanism, structure for actuating or resetting it and for manually tripping it.

In the example illustrated such support is indicated at 26, the same comprising the member or plate 26 secured to the standards 27, which in turn are secured at 28, 28 to the base 1. In the example illustrated, the supporting structure extends across in front of the switches or breakers and is supported by standards on opposite sides of the breakers. It will be understood, however, that the support may be so disposed that it is secured to the base 1 between the switches or breakers.

In the example illustrated, the support 26 carries the bearing bushing 29 and the bracket 30, the latter having a bifurcated upturned end 31 through which and the bore of the bushing 29 extends the rotatable and longitudinally movable shaft 32. The member 33 having the upturned end 34 has aligned holes through which the shaft 32 extends, the member 33 being secured to the shaft 32 by the screw 35. Secured to the member 33 is the block or member 36, preferably of insulating material, as indicated, and having the lateral edges 37, 37 adapted to engage, respectively, the pins or rollers 14 of the two breakers or switches. Secured on the front of the member 33 is a pin 38 adjacent to which is a second pin 39 secured upon the support 26. Wound around the bushing 29 is a spring 40 between whose upstanding ends 41, 41 are positioned the aforesaid pins 38 and 39.

Movable longitudinally with the shaft 32 but loose thereon and prevented from rotation therewith by the member 30, 31, is a downwardly and inwardly extending tripping member 42, one for each switch or circuit breaker, and both moving as a unit, each member 42 having its end disposed adjacent the arm 43 of the latch actuator 20.

On the outer end of the shaft 32 is secured, as by pin 44, the crank 45.

A spring 46 surrounding the shaft 32 is confined between the support 26 and a washer 47, whose movement to the right is limited by the pin 48.

Supported by the base 1, or in any other suitable manner, is a housing H having a door, cover or wall 49. The housing as a whole, including the wall 49, may be removable or detachable; or the wall 49 may itself be detachable or removable, or when a door, may be movable by sliding or pivotal action with respect to the housing H proper.

Within the housing are enclosed the circuit breakers and the associated actuating and tripping mechanism carried by the support 26.

Upon the base 1, or a base adjacent thereto, may be carried, as indicated in Fig. 2, additional control mechanism of any kind which may be related to the same circuit or apparatus co-acting with the same circuit protected by the switches or breakers above described. For example, such additional control mechanism may be the rheostat R, of which 50 is the movable arm which may be held in its right hand position by the electro-magnet 51. The control mechanism R or equivalent may also be enclosed in the housing H or in a compartment thereof, and upon the wall or door 49 of the housing may be disposed mechanism, not shown, for manually operating the member 50 or any other member of the associated control mechanism.

Carried by the wall or door 49 and substantially co-axial with the shaft 32 is the bearing bushing 52, in which is rotatable and longitudinally movable the shaft 53 upon whose inner end within the housing is secured the crank 54 having the spaced lugs 55, between which is adapted to be received the aforesaid crank 45. Upon the crank 54 is the lug 56, adapted to engage the face of the crank 45.

The shaft 53 adjacent its end outside of the housing is formed, as indicated in Figs. 7 and 7ª, with the flattened or squared portion 57 which extends through similarly shaped holes 58, Figs. 8 and 8ª, in the limbs of the member 59, to which is secured the operator's handle 60. Between the limbs of the member 59 and surrounding the shaft 53 is the spring 61, which opposes inward longitudinal movement of the shaft 53 under pressure exerted by the hand or otherwise upon the button 62.

The operation is as follows:

With both the switches or circuit breakers in the closed or set position as indicated in Fig. 1, upon occurrence of predetermined abnormal electrical condition, as predetermined overload of current, one or both of the electro-magnets 15 will attract its or their armature or armatures 17 and so cause actuation of one or both latches 12 through the medium of the latch actuator 20. As a result, one or both breakers will be tripped. Upon tripping of a breaker, the toggle 8, 10 collapses, the restraint of the latch 12 having been removed, and the arm 5 swings in clockwise direction, as viewed in Fig. 1, about its pivot 6, and the bridging member 4 separates from the main terminals 2 and 3, interrupting the circuit.

Assuming both breakers to be in open position, they may be reset by first rotating the handle 60 in one direction, as clockwise, as viewed in Fig. 2, whereupon the right hand edge 37 of member 36 will engage the member 14 of the right hand breaker, which member 14, when open, as assumed, is in the dotted position indicated. By continuing the clockwise movement of the handle 60, the pin or roller 14 is forced downwardly, causing extension of the toggle and movement of the contact member toward circuit closing position, which it finally reaches when the toggle is extended and the latch 12 engages the member 8. The handle 60 is then rotated in counter-clockwise direction, and in like manner the member 14 of the left hand breaker is forced downwardly, moving the breaker to circuit closing position and latching it.

In this operation the rotative movement of the handle 60 is communicated through shaft 53 and crank 54 to crank 45 and thence to shaft 32 and thence to the member 36. Such rotative movement is accompanied by a winding of the spring 40 which, when the handle 60 is released, returns the member 36 to the central or neutral position indicated.

If it should be desired to trip the breakers manually, the operator pushes inwardly upon the button 62, when the member 36 is in the above mentioned neutral or central position, causing the shaft 53 to move toward the left, Fig. 1, in opposition to spring 61, sliding through the member 59, while handle 60 remains in its middle or neutral position, the shaft 53 carrying the lug 56 against the crank 45 and so pushing the shaft 32 toward the left, in opposition to spring 46, and so moving the tripping members 42 into engagement with the latch actuators 20 of both switches or circuit breakers, these actuators in turn actuating the latches 12, and so affecting tripping of both breakers. Upon release of the button 62 the springs 46 and 61 restore the shafts 32 and 53, respectively, to their normal positions indicated in Fig. 1.

By the structure described, the wall or door 49 may be detached or moved to different position, carrying with it the actuating and tripping structure of which the member 54 is detachably related with respect to the member 45, which both actuates and trips the tripping mechanism through the structure carried by the support 26 within the housing. In returning the wall or door 49 to the position indicated in Fig. 1, the parts automatically assume their cooperative relation illustrated.

What I claim is:

1. The combination with an automatic circuit breaker comprising a movable contact member, an operating member therefor, and automatic tripping mechanism, of an actuating member detached from said operating member adapted to engage and actuate said operating member to reset said circuit breaker, manually operable means for tripping said circuit breaker, a housing enclosing the aforesaid structure, and means within said housing and detached from and positioned for actuating said actuating member and said manually operable tripping means operable from the exterior of said housing and movable with a wall thereof to and from operative position.

2. The combination with an automatic circuit breaker comprising a movable contact member, an operating member therefor, and automatic tripping mechanism, of structure partaking of different movements for respectively actuating said operating member and tripping said circuit breaker, a housing enclosing the aforesaid structure, and a member within said housing and detached from said structure operable from the exterior of said housing for imparting said movements to said structure.

3. The combination with an automatic circuit breaker comprising a movable contact member, an operating member therefor, and automatic tripping mechanism, of structure partaking of different movements for respectively actuating said operating member and tripping said circuit breaker, a housing enclosing the aforesaid structure, and a member within said housing and detached from said structure for imparting said movements to said structure operable from the exterior of said housing and movable with a wall thereof to and away from operative relation with said structure.

4. The combination with an automatic circuit breaker comprising a movable contact member, an operating member therefor, and automatic tripping mechanism, of structure partaking of rotatable and rectilinear movements, said structure by one of said movements actuating said operating member to reset said circuit breaker and by the other movement tripping said circuit breaker, a housing enclosing the aforesaid structure, and a member within said housing and detached from said structure and partaking of rotary and rectilinear movements for imparting said movements to said structure, said member operable from the exterior of said housing and movable with a wall thereof to and from operative relation with said structure.

5. The combination with automatic circuit breaker mechanism comprising independently operable switch arms, means for restraining them in normal position, and automatic tripping mechanism, of means partaking of different movements for resetting said switch arms one at a time, a housing enclosing the aforesaid structure, and means within said housing and detached from said resetting means for imparting to said resetting means said different movements operable from the exterior of said housing and movable with a wall thereof to and from operative relation with said resetting means.

6. The combination with automatic circuit breaker mechanism comprising independently operable switch arms, means for restraining them in normal position, and automatic tripping mechanism, of means partaking of different movements for resetting said switch arms one at a time, a fixed support for said resetting means, a housing enclosing the aforesaid structure, and means within said housing and detached from said resetting means for imparting to said last named means said different movements operable from the exterior of said housing and movable with a wall thereof to and from operative relation with said resetting means.

7. The combination with automatic circuit breaker mechanism comprising independently operable switch arms, means for restraining them in normal position, and automatic tripping mechanism, of structure partaking of different movements for resetting said switch arms and of a further movement for tripping said circuit breaker mechanism, a housing enclosing the aforesaid structure, and a member within said housing and detached from said structure operable from the exterior of said housing for communicating said movements to said structure and movable with a wall of said housing to and from operative relation with said structure.

8. The combination with automatic circuit breaker mechanism comprising independently operable switch arms, means for restraining them in normal position, and automatic tripping mechanism, of structure rotatable in opposite directions for resetting said switch arms one at a time and partaking of longitudinal movement for tripping said circuit breaker mechanism, a housing enclosing the aforesaid structure, and a member within said housing and detached from said structure operable from the exterior of said housing for communicating said movements to said structure and movable with a wall of said housing to and from operative relation with said structure.

9. The combination with automatic circuit breaker mechanism comprising independently operable switch arms, means for restraining them in normal position, and automatic tripping mechanism, of structure rotatable in opposite directions for resetting said switch arms one at a time and partaking of longitudinal movement for tripping said circuit breaker mechanism, a fixed support for said structure, a housing enclosing the aforesaid structure, and a member within said housing and detached from said structure operable from the exterior of said housing for communicating said movements to said structure and movable with a wall of said housing to and from operative relation with said structure.

10. The combination with a base, of automatic circuit breaker mechanism comprising independently operable switch arms having operating members movable in planes normal to said base, means for restraining said arms in normal position, and automatic tripping mechanism, of a fixed support carried by said base, a rotatable and longitudinally movable shaft carried thereby, means actuated by said shaft by rotative movements in opposite directions for resetting said switch arms one at a time and by longitudinal movement for tripping said circuit breaker mechanism, a housing enclosing the aforesaid structure, and a rotatable and longitudinally movable member within said housing and detached from said shaft for imparting like movements to said shaft operable from the exterior of said housing and movable with a wall thereof to and from operative relation with said shaft.

11. The combination with the movable contact member of a switch and an operating member therefor, means for restraining said contact member in normal position, a control member partaking of rotary and longitudinal movements disposed adjacent said switch, an actuating member free of said operating member adapted to be rotated by said control member to engage and actuate said operating member, and a tripping member separate from said actuating member partaking of longitudinal movement with said control member for tripping said contact member.

12. The combination with the movable contact member of a switch and an operating member therefor, means for restraining said contact member in normal position, a control member partaking of rotary and longitudinal movements disposed adjacent said switch, an actuating member free of said operating member adapted to be rotated by said control member to engage and actuate said operating member, a tripping member moved longitudinally by said control member to trip said contact member and loose on said control member as regards rotary movement thereof, and means for preventing rotation of said tripping member.

13. The combination with a controller and automatic circuit breaker mechanism, of a housing common thereto having a movable wall, said circuit breaker mechanism comprising a circuit breaker having an operating member for resetting the same, a fixed support adjacent said circuit breaker mechanism, an actuating member carried by said support and adapted to engage and actuate said operating member, and a member within said housing and detached from said actuating member operable from the exterior of said housing for actuating said actuating member and movable with said wall to and from position for operating said actuating member.

14. The combination with automatic circuit breaker mechanism comprising independently operable switch arms, means for restraining them in normal position, and automatic tripping mechanism, of structure partaking of movements in different directions for resetting said switch arms one at a time and for actuating said restraining means, said structure comprising means movable in a predetermined plane for actuating said switch arms, a tripping member separate from said last named means and movable in a different plane for actuating said restraining means, and a member for actuating said movable means and said tripping member.

15. Automatic circuit breaker mechanism comprising a movable switch arm, means for restraining it in normal position, and automatic tripping mechanism, of structure partaking of different movements for operating said switch arm and said restraining means, respectively, said structure comprising actuating and tripping members movable in unison with each other in one direction for actuating said restraining means, said actuating member movable in a different direction independently of said tripping member for actuating said switch arm.

16. Automatic circuit breaker mechanism comprising a movable switch arm, means for restraining it in normal position, and automatic tripping mechanism, of an operating member for actuating said switch arm, a tripping member, said operating and tripping members partaking of rectilinear movement for actuating said restraining means, and said operating member partaking of rotary movement independently of said tripping member for actuating said switch arm.

17. Automatic circuit breaker mechanism comprising a movable switch arm, a latch actuator, electro-responsive means for actuating said latch actuator, and structure comprising a member for operating said switch arm and a tripping member for actuating said latch actuator, said operating member movable with said tripping member in one direction for actuating said restraining means, and said operating member rotatable independently of said tripping member for actuating said switch arm.

18. Automatic circuit breaker mechanism comprising a movable switch arm, means for restraining the same in normal position, automatic tripping mechanism therefor, and mechanism for actuating said switch arm and said restraining means comprising a longitudinally movable and rotatable shaft, a tripping member moved longitudinally with said shaft for actuating said restraining means, means preventing rotation of said tripping member with said shaft, and an operating member rotatable with said shaft for resetting said switch arm.

19. The combination with automatic circuit breaker mechanism comprising a movable contact member, means for restraining the same in normal position, and automatic tripping means therefor, of a tripping member for actuating said restraining means, a longitudinally movable member for actuating said tripping member, an operating member separate from said tripping member for resetting said movable contact member by movement of rotation, and a member for actuating said operating member and said tripping member.

20. The combination with automatic circuit breaker mechanism comprising a movable contact member, means for restraining the same in normal position, and automatic tripping means therefor, of a tripping member for actuating said restraining means, a longitudinally movable member for effecting movement of said tripping member, and an operating member separate from said tripping member for resetting said movable contact member, said operating member being rotatable and said tripping member non-rotatable about the axis of movement of said longitudinally movable member.

21. The combination with an automatic circuit breaker comprising a movable contact member, means for restraining the same in normal position, and automatic tripping mechanism, of a tripping member, an operating member separate from said tripping member and operable independently thereof, said operating member partaking of rotative movement for resetting said movable contact member, and a member movable longitudinally substantially in the axis of rotation of said operating member for actuating said tripping member.

22. The combination with an automatic circuit breaker comprising a movable contact member, means for restraining the same in normal position, and automatic tripping mechanism, of an operating member for resetting said movable contact member, a tripping member separate from said operating member, and a control member movable in one direction for effecting movement of said tripping member and movable in another direction for actuating said operating member independently of said tripping member.

23. The combination with an automatic circuit breaker comprising a movable contact member, means for restraining the same in normal position, and automatic tripping mechanism, of an operating member for resetting said movable contact member, a tripping member separate from said operating member, and a control member movable longitudinally for effecting movement of said tripping member and rotatable for effecting rotatable movement of said operating member independently of said tripping member.

24. The combination with an automatic circuit breaker comprising a movable contact member, means for restraining the same in normal position, and automatic tripping mechanism therefor, of an actuating member detached from said circuit breaker and adapted to actuate said movable contact member, a housing enclosing said circuit breaker and said actuating member, and a member within said housing and detached from said actuating member and operable from the exterior of said housing for actuating said actuating member.

25. The combination with an automatic circuit breaker comprising a movable contact member, means for restraining the same in normal position, and automatic tripping mechanism therefor, of an actuating member detached from said circuit breaker and adapted to actuate said movable contact member, a housing enclosing said circuit breaker and said actuating member, said housing having a movable wall, and a member operable from the exterior of said housing and movable with said wall and disposed within said housing in detached relation with respect to said actuating member for actuating the same.

26. The combination with an automatic circuit breaker comprising a movable contact member, means for restraining the same in normal position, and automatic tripping mechanism therefor, of a rotatable actuating member detached from said circuit breaker and adapted to actuate said movable contact member, a housing enclosing said circuit breaker and said actuating member, and a rotatable member within said housing and detached from said actuating member and operable from the exterior of said housing for actuating said actuating member.

27. The combination with an automatic circuit breaker comprising a movable contact member, means for restraining the same in normal position, and automatic tripping mechanism therefor, of a rotatable actuating member detached from said circuit breaker and adapted to actuate said movable contact member, a housing enclosing said circuit breaker and said actuating member, said housing having a movable wall, and a rotatable member operable from the exterior of said housing and movable with said wall and disposed within said housing in detached relation with respect to said actuating member for actuating the same.

28. The combination with a circuit breaker comprising a movable contact member, means for restraining the same in normal position, and automatic tripping mechanism therefor, of a fixed support adjacent said circuit breaker, an actuating member carried by said support and disposed in detached relation with respect to said contact member for actuating the same, a housing enclosing said circuit breaker, support and actuating member, and a member operable from the exterior of said housing carried by said housing and disposed within the same in detached relation to said actuating member for actuating the same.

29. The combination with a circuit breaker comprising a movable contact member, means for restraining the same in normal position, and automatic tripping mechanism therefor, of a fixed support adjacent said circuit breaker, an actuating member carried by said support and disposed in detached relation with respect to said contact member for actuating the same, a housing enclosing said circuit breaker, support and actuating member, said housing having a movable wall, and a member movable with said wall and disposed within said housing in detached relation to said actuating member for actuating the same.

30. The combination with automatic circuit breaker mechanism comprising a movable contact member, means for restraining the same in normal position, and automatic tripping means therefor, of a tripping member for actuating said restraining means, a rotary shaft, an operating member separate from said tripping member and rotated by said shaft for resetting said movable contact member, and a member movable relatively to said shaft in a direction substantially parallel with the axis of said shaft for actuating said tripping member.

31. The combination with automatic circuit breaker mechanism comprising a movable switch member, means for restraining the same in normal position, and automatic tripping means, of a tripping member for actuating said restraining means to trip said switch member, an actuating member partaking of rotative movement independently of said tripping member for resetting said switch member, and a member movable longitudinally independently of and with respect to said tripping member substantially in the axis of rotation of said actuating member for actuating said tripping member to trip said switch member.

32. The combination with a controller and automatic circuit breaker mechanism, of a housing common thereto and enclosing them, said circuit breaker mechanism comprising a movable contact member, means for restraining it in normal position, and automatic tripping means, a fixed support within said housing adjacent said circuit breaker mechanism, an actuating member carried by said support in detached relation to said switch member and adapted to reset said switch member, and a member within said housing carried by said housing in detached relation to said actuating member and operable from the exterior of said housing for actuating said actuating member.

33. The combination with a controller and automatic circuit breaker mechanism, of a housing common thereto and enclosing them, said circuit breaker mechanism comprising movable contact structure, restraining means for said contact structure, and means for preventing closure of circuit by said contact structure upon occurrence of a predetermined electrical condition, of a fixed support within said housing adjacent said circuit breaker mechanism, an actuating member carried by said support in detached relation to said movable contact structure for resetting the same, and a member within said housing carried by said housing in detached relation to said actuating member and operable from the exterior of said housing for actuating said actuating member.

34. The combination with automatic circuit breaker mechanism comprising movable contact structure, means for restraining the same in normal position, and means preventing circuit closure by said movable contact structure during existence of a predetermined electrical condition, a housing enclosing said circuit breaker mechanism, a support within said housing, an actuating member carried by said support in detached relation to said movable contact structure for resetting said movable contact structure, and means carried by said housing within the same in detached relation to said actuating member and operable from the exterior of said housing for actuating said actuating member.

35. The combination with automatic circuit breaker mechanism comprising movable contact structure, means for restraining the same in normal position, and means preventing circuit closure by said movable contact structure during existence of a predetermined electrical condition, of a housing enclosing said circuit breaker mechanism, a support within said housing, means carried by said support and partaking of movements in different directions for respectively resetting said movable contact structure and actuating said restraining means, and means carried by said housing within the same in detached relation to said last named means and operable from the exterior of said housing for moving said last named means in said different directions.

36. The combination with automatic circuit breaker mechanism comprising movable contact structure, means for restraining the same in normal position, and means preventing circuit closure by said movable contact structure during existence of a predetermined electrical condition, of a housing enclosing said circuit breaker mechanism, a support within said housing, an actuating member carried by said support in detached relation to said movable contact structure for resetting the same, a tripping member carried by said support in detached relation to said restraining means, and a member carried by said housing within the same in detached relation to said actuating member and said tripping member and operable from the exterior of said housing for actuating said tripping member and for actuating said actuating member independently of said tripping member.

37. Automatic circuit breaker mechanism comprising a movable switch member, means for restraining it in normal position, and automatic tripping mechanism, of an actuator detached from said switch member and adapted to reset it, a tripping member separate from said actuator disposed in detached relation with respect to said restraining means, and means for actuating said tripping member and for actuating said actuator independently of said tripping member.

38. Automatic circuit breaker mechanism comprising a movable switch member, means for restraining it in normal position, and automatic tripping mechanism, of an actuator detached from said switch member and adapted to reset it, a tripping member separate from said actuator disposed in detached relation with respect to said restraining means, and a member disposed in detached relation to said actuator and said tripping member for imparting to them characteristically different movements for effecting, respectively, tripping and resetting of said switch member.

In testimony whereof I have hereunto affixed my signature this 30th day of November, 1920.

WILLIAM M. SCOTT.